(12) United States Patent
Thibeault

(10) Patent No.: US 7,742,771 B2
(45) Date of Patent: Jun. 22, 2010

(54) AUTOMATED LOAD BALANCING OF RECEIVERS IN A NETWORK

(75) Inventor: Brian K. Thibeault, Attleboro, MA (US)

(73) Assignee: General Instrument Corporation, Horsham, PA (US)

( * ) Notice: Subject to any disclaimer, the term of this patent is extended or adjusted under 35 U.S.C. 154(b) by 910 days.

(21) Appl. No.: 11/218,017

(22) Filed: Sep. 1, 2005

(65) Prior Publication Data

US 2007/0058542 A1 Mar. 15, 2007

(51) Int. Cl.
*H04W 72/00* (2009.01)
(52) U.S. Cl. .................. 455/453; 455/454; 455/423; 455/424; 455/425
(58) Field of Classification Search ........... 455/453, 455/454, 423, 424, 425; 370/229, 237, 252, 370/280, 399; 725/111
See application file for complete search history.

(56) References Cited

U.S. PATENT DOCUMENTS

| | | | | |
|---|---|---|---|---|
| 6,229,792 | B1 * | 5/2001 | Anderson et al. | 370/280 |
| 6,456,597 | B1 * | 9/2002 | Bare | 370/252 |
| 6,477,197 | B1 | 11/2002 | Unger | |
| 2002/0181395 | A1 * | 12/2002 | Foster et al. | 370/229 |
| 2003/0108052 | A1 * | 6/2003 | Inoue et al. | 370/399 |
| 2003/0158940 | A1 | 8/2003 | Leigh | |
| 2004/0233234 | A1 * | 11/2004 | Chaudhry et al. | 345/735 |
| 2005/0010958 | A1 | 1/2005 | Rakib et al. | |
| 2006/0013147 | A1 * | 1/2006 | Terpstra et al. | 370/252 |

FOREIGN PATENT DOCUMENTS

WO 0192901 A 12/2001

OTHER PUBLICATIONS

PCT International Search Report and Written Opinion for PCT/US06/27331. Issued on Mar. 7, 2008.
EPC Extended Search Report, RE: Application #06787267.1 - 2413/1925122 PCT/US2006027331 Jan. 26, 2010.
Cable Labs: 'Radio Frequency Interface Specification", Aug. 4, 2004, pp. 1-524.

* cited by examiner

*Primary Examiner*—Joseph H Feild
*Assistant Examiner*—Huy D Nguyen
(74) *Attorney, Agent, or Firm*—Larry T. Cullen

(57) ABSTRACT

A spare receiver in a CMTS is used to determine the RF connectivity status of the receivers of a Load Balancing Group or Spectrum Group in the CMTS in the network. The spare receiver is connected to a receiver of the Load Balancing Group or Spectrum Group which does not have modems registered. The spare receiver is also configured to have the communication protocols of another selected receiver of the Load Balancing Group or Spectrum Group which does have modems registered. A transmitter sends a request for a response to a modem registered with the selected receiver. If the spare receiver, which is configured to have the same communication protocols as the selected receiver, receives the response from the modem, the unregistered receiver under test is determined to have sufficient RF connectivity to be included in Load Balancing operations. Each unregistered receiver in the Load Balancing Group or Spectrum Group is analyzed in the same manner.

12 Claims, 4 Drawing Sheets

AUTOMATED LOAD BALANCING OF RECEIVERS IN A NETWORK

FIELD OF THE INVENTION

This invention relates to automated load balancing of receivers in a network. This invention more particularly relates to testing receivers in a network to determine which receivers are suitable to participate in load balancing operations.

BACKGROUND

Coaxial cable television systems have been in widespread use for many years and extensive networks have been developed. The extensive and complex networks are often difficult for a cable operator to manage and monitor. Particularly, a typical cable network generally contains a headend which provides content to a cable modem termination system (CMTS) containing several receivers, each receiver is usually connected to modems of many subscribers, e.g., a single receiver may be connected to hundreds of modems. In many instances the operator will cable multiple receivers together to serve a particular area of a town or city.

Cable operators often use Load Balancing Groups and/or Spectrum Groups to equalize the load of the traffic across receivers and is a feature that is tested for DOCIS 2.0 by Cable Labs. Load Balancing is often performed by a software program controlled by cable operators to help prevent one or more receivers from being overloaded with data while other receivers are being underused. In order to have receivers belong to the same Load Balancing Group or Spectrum Group all of the receivers in the group must be physically wired together in the RF head end. Multiple receivers in Load Balancing and Spectrum Groups may be used for agility whenever the CMTS detects that an individual receiver has excessive loads, such as excessive data traffic.

In order for cable operators to take advantage of the Load Balancing features they have to first manually configure every Load Balancing Group and/or Spectrum Group. For example, the Motorola BSR 64000 has 12 slots available for CMTS cards with 8 receivers on each card. The worse case scenario, but a common one, would be that the operator has to configure 48 Load Balancing Groups, with two upstreams per Load Balancing Group and/or 48 Spectrum Groups. These are time consuming efforts that can also be prone to errors for the cable operator. In some instances cable operators may not want to take advantage of these features because they do want to expend the resources to perform the manual configuration.

There is presently no suitable technique for determining if a receiver designated to a Load Balancing Group or Spectrum Group is actually capable of carrying the loads required. For example, if a receiver R1 in a Load Balancing Group has an excessive load a CMTS operator may shift portions of the load on R1 to receiver R2 in the Load Balancing Group by attempting to register several modems M associated with R1 to R2. However, if receiver R2 has a poor RF connection, such as a damaged coaxial cable, the modems M will deregister from receiver R2 and re-registered again on receiver R1. Without operator intervention, the load balancing operation is caught in an endless cycle of registering/deregistering modems between R1 (being overloaded) and R2 (connected with a bad cable) resulting in numerous modem deregistration. The CMTS operator must determine which receiver has failed, the cause of the failure, and manually remove the failed receiver from the Load Balancing Group. Even if a CMTS could detect a bad cable directly at the input of the receiver, presently, no CMTS's are known to be able to detect bad or missing cables further down the RF plant.

SUMMARY

This invention describes exemplary methods and apparatus for improving load balancing without mass modem deregistration. The cable operator will be able to configure Load Balancing Groups or Spectrum Groups the way they intended and quickly determine the cause of problems in the groups.

This invention also provides for automatically determining if a receiver in a Load Balancing Group or Spectrum Group is suitable to carry the required load.

The invention helps simplify the operation of CMTS products for cable operators. By automatically determining the suitability of receivers in the Load Balancing Group or Spectrum Group, the cable operator can ensure that load balancing only moves modems to suitable receivers. Operator intervention is no longer required and modem deregistration is prevented. The cable operators are also informed of defective or failed units in the cable system or RF problems with the CMTS wiring.

The invention utilizes a spare receiver to perform non-intrusive connectivity tests on the receivers on the CMTS card.

An apparatus for determining the connectivity of a receiver in a Load Balancing Group or Spectrum Group may comprise: a transmission unit capable of transmitting signals according to predetermined communication protocols; a plurality of receivers in the Load Balancing Group or Spectrum Group, each receiver being capable of receiving signals according to predetermined communication protocols; a spare receiver capable of receiving signals using the predetermined communication protocols of each of the plurality of receivers; a switching unit which selectively connects the spare receiver to a signal line associated with one of the plurality of receivers, enabling the spare receiver to receive signals sent to a selected one of the plurality of receivers; and a microprocessor configured to instruct the spare receiver to receive signals using a predetermined communication protocol of a first selected receiver of the plurality of receivers and to instruct the switching unit to connect the spare receiver to another selected receiver of the plurality of receivers, wherein the microprocessor instructs the spare receiver to connect to another receiver which does not have modems registered.

In an apparatus for determining the connectivity of a receiver in a Load Balancing Group or Spectrum Group, when the transmission unit sends a request for a response to a modem connected to the network to respond to the first selected receiver, the first selected receiver is determined to have sufficient RF connectivity if the spare receiver receives a response from the modem to the request for a response.

A method of determining connectivity status of a receiver in a Load Balancing Group or Spectrum Group having a plurality of receivers may comprise the steps of: (A) identifying a receiver of the plurality of receivers which does not have a modem registered thereon as an unregistered receiver; (B) connecting a spare receiver to a signal line associated with the unregistered receiver; (C) configuring a spare receiver to substantially communicate with communication protocols associated with a selected receiver of the plurality of receivers; (D) providing a request for information from a transmission unit to a modem connected to the selected receiver; and (E) determining if the spare receiver detects a response from the modem.

In the method of determining connectivity status of a receiver in a Load Balancing Group or Spectrum Group, if the spare receiver detects a response from the modem, the unregistered receiver is determined to have sufficient RF connectivity.

A computer readable medium may contain instructions for a processor to control a Load Balancing operation associated with a Load Balancing Group or Spectrum Group of a plurality of receivers, the computer readable medium containing instructions for the processor to perform the steps of: (A) identifying a receiver of the plurality of receivers which does not have a modem registered thereon as an unregistered receiver; (B) connecting a spare receiver to a signal line associated with the unregistered receiver; (C) configuring a spare receiver to substantially communicate with communication protocols associated with a selected receiver of the plurality of receivers; (D) providing a request for information from a transmission unit to a modem connected to the selected receiver; and (E) determining if the spare receiver detects a response from the modem.

In computer readable medium, if the spare receiver detects a response from the modem, the unregistered receiver is determined to have sufficient RF connectivity.

The invention allows non-intrusive connectivity tests on all the receivers in a Load Balancing Group or Spectrum Group on a CMTS card. The invention also allows a cable operator to determine whether a primary receiver which does not currently have modems registered on it is actually suitable to be included in a Load Balancing operation. The invention determines the RF connectivity status with little or no manual configuration required by a cable operator. The techniques of the invention can be practiced without loss of service for any subscriber because they do not have to use any active receivers for testing. Even voice calls should not be affected by any of the testing.

DETAILED DESCRIPTION OF THE DRAWINGS

To solve the problems of the prior art, a spare or 9th receiver in an eight receiver unit may be used. The spare receiver taps in where the cable signal comes into the receiver ports so the spare receiver can receive the same signal as the receiver being tested. Preferably, the spare receiver can matrix with only one primary receiver at a time. When the CMTS card is first powered on some receivers may not have modems registered on them. If a cable operator had a receiver shutdown for some reason, then after it was brought back on line, the receiver is unlikely to be recognized as being eligible to participate in a Load Balancing operation until the cable operator manually moves at least one modem to it. Those of skill in the art will appreciate that there may be many reasons why some receivers may end up with no modems registered on them and therefore would not take part in Load Balancing. If modems are staying registered on a receiver then the RF plant is not an issue and there is no need to determine the sufficiency of the RF connectivity of the receivers in a Load Balancing Group or Spectrum Group.

Figure 1:
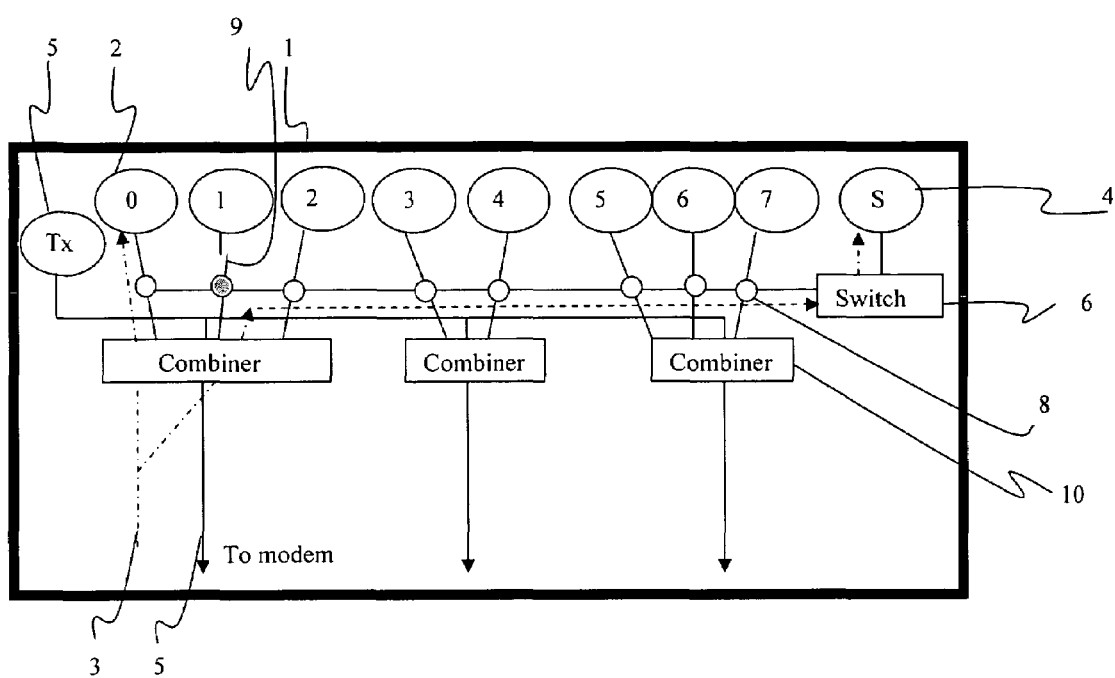
FIG. 1 illustrates an exemplary architecture of a CMTS in accordance with the principles of the invention.

FIG. 1 illustrates an exemplary CMTS 1 with primary receivers 2 (R0-R7), which may be a Motorola BSR64000 CMTS. A transmitter unit 5 is also illustrated which serves to transmit signals to modems of the users (not shown) via signal path 5 and combiner 10. Transmitter unit 5 may be a single transmitter or multiple transmitters. Those of skill in the art will appreciate that transmitter unit 5 preferably transmits to the modems according to predetermined communication protocols, such as Data Over Cable Systems Interface Specification (DOCSIS) protocols.

While eight receivers are shown, those of skill in the art will appreciate that any number of receivers may be used. In the exemplary illustration, receivers R0, R1 and R2 are in one Load Balancing Group, receivers R3 and R4 are in another group and R5, R6 and R7 are in the last group. The spare receiver 4, illustrated as a $9^{th}$ receiver, can preferably tap into any one receiver R0-R7 at a time and, in the example of FIG. 1, is tapped into receiver 1 via tap 8. Combiner 10 receives signals from user modems and provides them to receivers 2 (R0-R7). Dotted line 3 depicts the return path that a response from a cable modem (not shown) to receiver R0 would take in the exemplary implementation of FIG. 1. Broken line 9 depicts an inadequate, e.g. broken, cable connecting to receiver R1. Those of skill in the art will appreciate that the CMTS is used generally to refer to any suitable modem termination system, that the architecture illustrated is exemplary, and any type of cabling (connections) may be used, such as coaxial wires, optical fibers, twisted pairs, and wireless connections.

Figure 2:
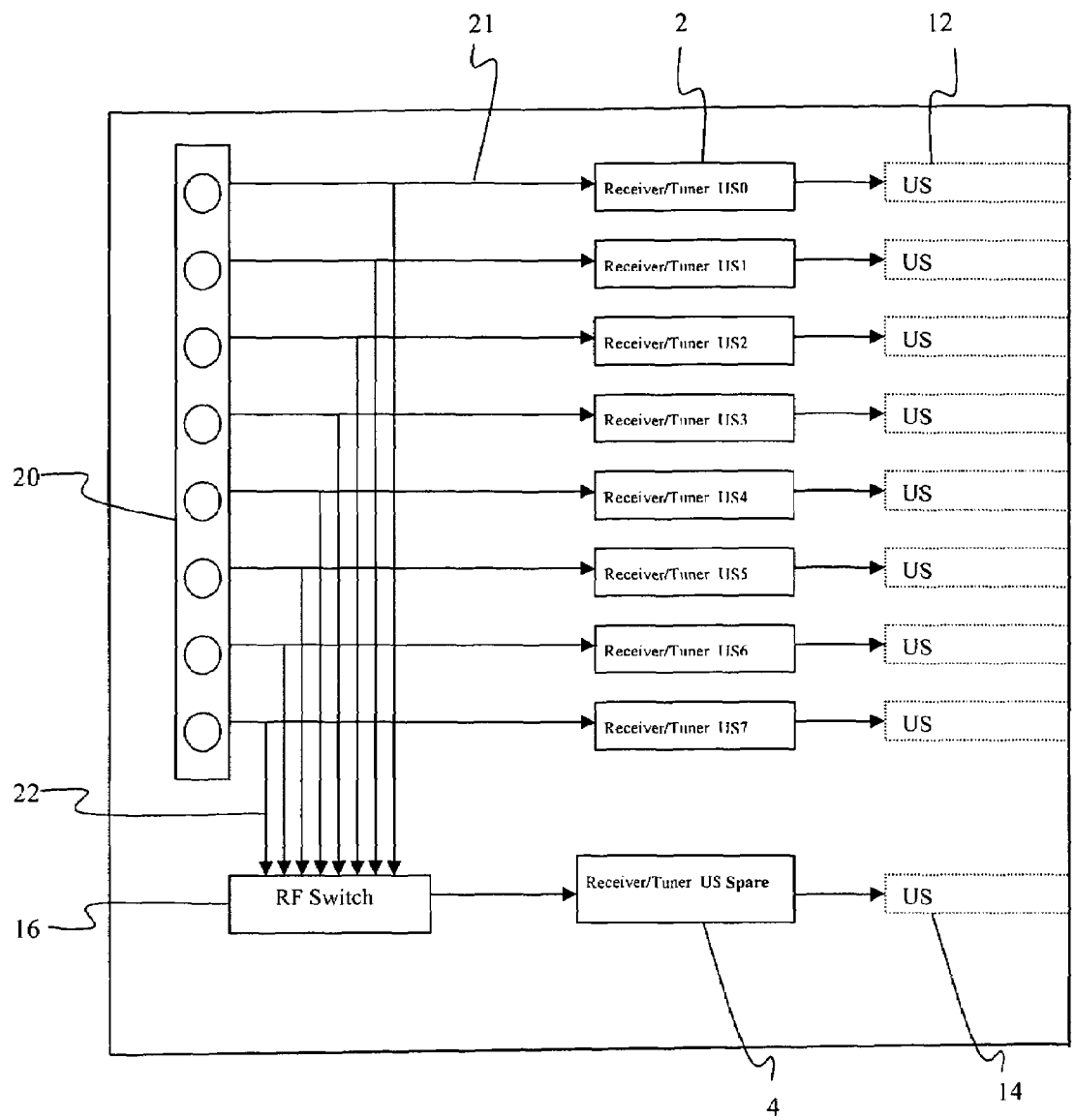
FIG. 2 illustrates an exemplary configuration for connecting a spare receiver in an exemplary CMTS in accordance with the principles of the invention.

FIG. 2 illustrates the spare receiver 4 tapped into each of primary receiver ports 2 (e.g. R0-R7) in a non-intrusive manner. As illustrated, CMTS receiver ports 20, which may be in the form of Amphenol connectors, are provided to allow cables, e.g. coaxial cables, (not shown) to be connected with primary receivers 2. As also illustrated, signals from the headend are preferably provided through ports 20 to receivers 2 and demodulators 12.

Spare receiver 4 preferably taps into signal lines 21 of primary receiver ports 20 via signal lines 22, and the taps are preferably located where the cable signal comes from receiver ports 20 into the receivers 2 so both the connected primary receiver 2 and the spare receiver 4 may receive the same signal. Those of skill in the art will appreciate that each of the primary receivers 2 (e.g. receivers R0-R7) receive signals according to different communication characteristics, e.g. communication on a different frequency (RF band) and communication protocols. Spare receiver 4 is preferably tunable to the RF bands of each of the primary receivers 2. Preferably, the spare receiver 4 connects (matrices) with only one primary receiver 2 at a time.

Figure 3:
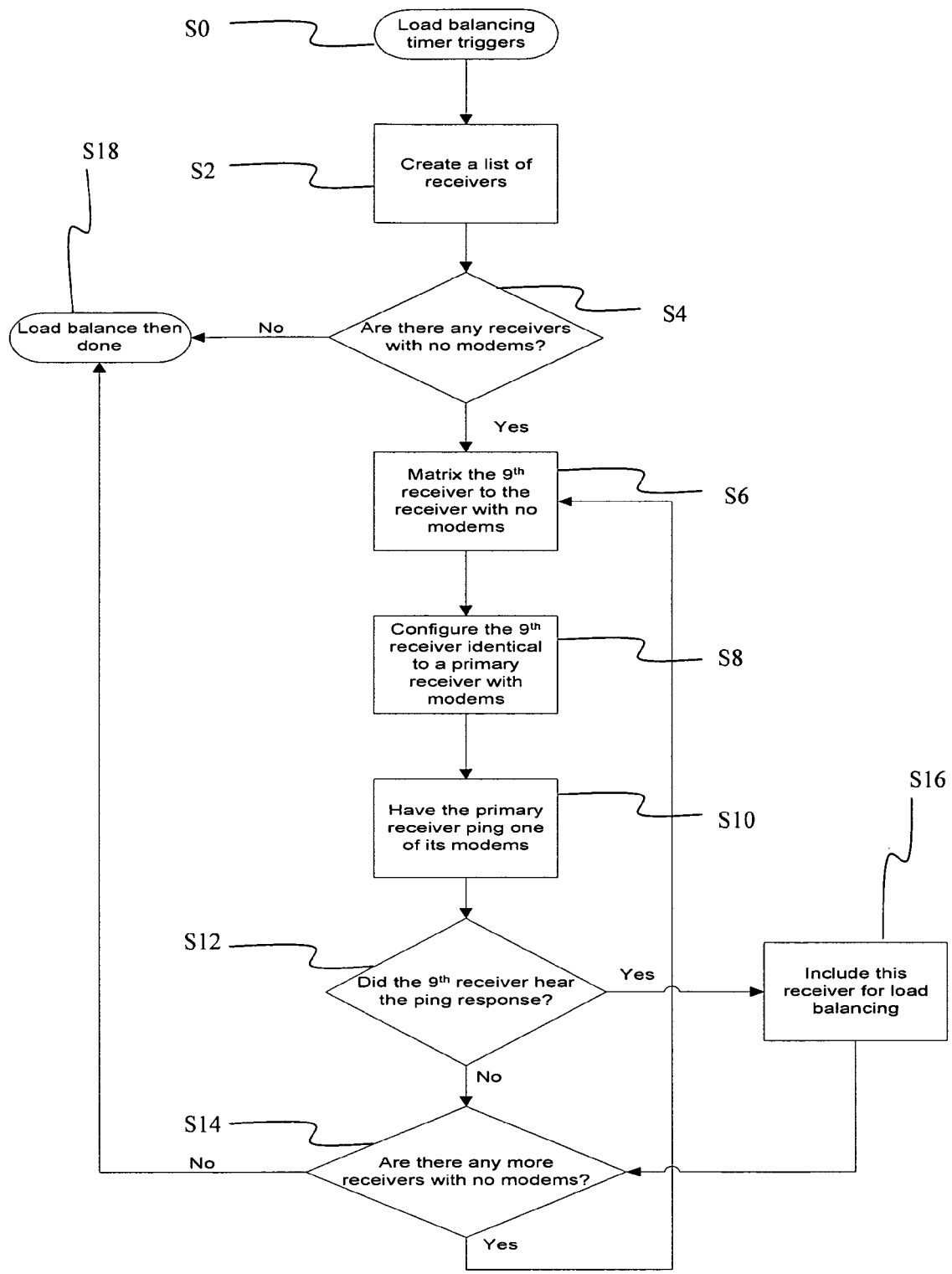
FIG. 3 illustrates an exemplary flow diagram of an exemplary process for determining the RF connectivity of an unregistered receiver according to the principles of the invention.

FIG. 3 illustrates an exemplary process to perform Load Balancing in accordance with the principles of the invention. As illustrated in FIG. 3, a load balancing timer triggers to determine the need for performing load balancing, step S0. A list of receivers in the Load Balancing Group or Spectrum Group is created, step S2. The number of modems registered to each receiver is determined and receivers without any modems registered are identified as unregistered receivers, step S4. If all of the receivers have modems registered, step S4, No, then all of the receivers are presumed to have a sufficient RF connection and load balancing is performed, step S18. If receivers are identified which do not have modems registered (a.k.a. unregistered receivers), step S4, Yes, then the spare receiver (e.g. $9^{th}$ receiver in an eight receiver unit or an unused receiver) is connected (matrixed)

with an unregistered receiver, step S6. As illustrated in step S8 the tunable spare receiver is preferably configured to he same communication parameters as another primary receiver in the Load Balancing Group or Spectrum Group which has a modem registered, including being configured to communication characteristics of the same RF band and communication protocols (e.g. MAP data) utilized by the selected primary receiver. In this manner, the spare receiver preferably is configured to receive communication directed toward the selected primary receiver with modems registered.

As illustrated in step S10, a modem is selected which is registered on the primary receiver selected in step S8 and a communication request signal requesting a response from the modem is sent from the transmission unit 5 to the modem. Those of skill in the art will appreciate that the communication signal may be a "ping", a station maintenance request or any other signal requesting a response.

Because the spare receiver is configured to have the same communication characteristics as the primary receiver with modems registered, selected in step S8, when the modem responds to the communication request, both the selected primary receiver and the spare receiver detect the response, if any, by the modem. If the spare receiver detects the modem response, step S12 Yes, then the unregistered receiver is determined to have an adequate RF connection and is included as being eligible for load balancing, step S16. If the spare receiver did not hear the modem response, step S12 No, then the unregistered receiver is not confirmed to have a sufficient RF connection and is not included as being eligible for load balancing. Since certain responses may be expected within a predetermined period of time, the process may preferably determine if a response has been received within a predetermined period of time after the communication request.

If the unregistered receiver is not the last unregistered receiver, step S14 No, then the process returns to step S6 and repeats steps S8-S14 and determines if the other unregistered receivers should be included for load balancing, step S16. The process continues to test each unregistered receiver, step S14, Yes. The load balancing is performed using the receivers which have been identified as being eligible for load balancing, step S14, No, and step S18.

Those of skill in the art will appreciate that since the active receivers are not required to be used for testing, the process illustrated in FIG. 3 is non-intrusive to the cable network, and may be performed without causing a loss or disruption of service to subscribers. Even voice calls over the cable network should not be affected by any of the testing described above. The process in FIG. 3 may be performed periodically, such as when the CMTS initiates a Load Balancing operation, or may be manually initiated by a cable operator, e.g. once per week, every 24 hours, etc., and may also be initiated by a service call indicating problems or indicating a change in the cable network.

Those of skill in the art will appreciate that the exemplary process in FIG. 3 may operate on a Load Balancing Group or Spectrum Group identified by a cable network operator, or an automatic process may be used to determine the Load Balancing Group or Spectrum Group, such as described in afore mentioned copending application U.S. application Ser. No. 11/171,066 titled AUTOMATED MONITORING OF A NETWORK, herein incorporated by reference in its entirety.

Figure 4:
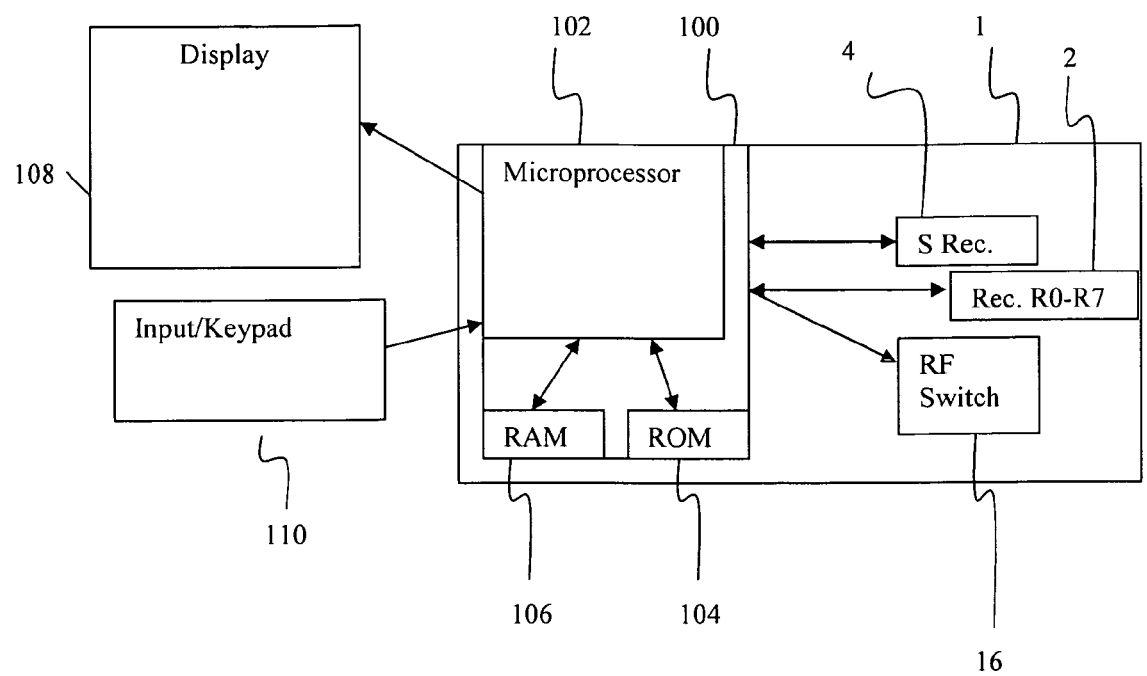
FIG. 4 illustrates an exemplary processing unit in accordance with the principles of the invention.

The processes in FIG. 3 may be implemented in hard wired devices, firmware or software running in a processor. A processing unit for a software or firmware implementation is preferably contained in the CMTS. FIG. 4 illustrates an exemplary processing unit 100 contained in the CMTS. Processing unit 100 preferably contains a microprocessor 102 which may receive information, such as instructions and data, from a ROM 104 or RAM 106.

Processing unit 100 is preferably connected to a display 108, such as a CRT or LCD display, which may display status information such as whether an unregistered receiver is eligible for load balancing. An input keypad 110 may also be connected to processing unit 100 and may allow an operator to provide instructions, processing requests and/or data to processor 100. Microprocessor 102 is preferably configured to provide instructions to RF switch 16 (FIG. 2) to select a primary receiver to be analyzed in accordance with the processes illustrated in FIG. 3. Microprocessor 102 is also preferably configured to configure spare receiver 4 to match the communication characteristics of the selected primary receiver. The communication characteristics of each receiver 2 may be stored on ROM 104 or RAM 106, or may be provided from an external source, such as the headend. RAM 104 and/or ROM 106 may also carry instructions for microprocessor 102 to perform the processes illustrated in any or all of FIG. 3.

Any of the processes illustrated in FIG. 3 may be contained on a computer readable medium which may be read by microprocessor 102. A computer readable medium may be any medium capable of carrying instructions to be performed by a microprocessor, including a CD disc, DVD disc, magnetic or optical disc, tape, silicon based removable or non-removable memory.

Those of skill in the art will appreciate that using the spare receiver to matrix with an unregistered receiver enables a determination of the RF connectivity of the unregistered receiver. The RF connectivity problems may be the result of problems in the cable network, such as removed, loose or damaged coaxial cables or may be an internal problem with a receiver. After the CMTS is cabled and modems are registered this tool could be used to perform Load Balancing using all of the receivers available in a Load Balancing Group or Spectrum Group rather than just the receivers which currently have modems registered. This allows the cable operator to more efficiently perform Load Balancing and obtain increased utilization of resources. This could also help prevent having the cable company from rolling a truck to attempt to fix a problem that is really in the head end. This will help cable operators debug cabling issues within their headend or downstream from the headend.

The principles of the invention may also be used to periodically run a diagnostic of the receivers in a Load Balancing Group or Spectrum Group to ensure the operators that the receivers in the Load Balancing Group or Spectrum Group may be utilized prior to transferring loads. This will result in less down time and loss of service to subscribers. For example, if mass deregistration of modems occurs after a Load Balancing operation a technician could run a diagnostic program on processing unit 100 to determine the problem. In this manner, the present invention provides a way for cable operators to automatically determine the sufficiency of their RF connectivity to specific receivers in Load Balancing Group or Spectrum Group on CMTS cards residing in the network without interrupting the network service.

What is claimed is:

1. An apparatus for determining the connectivity of a receiver in a Load Balancing Group or Spectrum Group comprising:

a transmission unit capable of transmitting signals according to predetermined communication protocols;

a plurality of receivers in the Load Balancing Group or Spectrum Group, each receiver being capable of receiving signals according to predetermined communication protocols;

a spare receiver capable of receiving signals using the predetermined communication protocols of each of the plurality of receivers;

a switching unit which selectively connects the spare receiver to a signal line associated with one of the plurality of receivers, enabling the spare receiver to receive signals sent to a selected one of the plurality of receivers; and a microprocessor configured to instruct the spare receiver to receive signals using a predetermined communication protocol of a first selected receiver of the plurality of receivers and to instruct the switching unit to connect the spare receiver to another selected receiver of the plurality of receivers, wherein the microprocessor instructs the spare receiver to connect to another receiver which does not have modems registered.

2. The apparatus of claim 1, wherein when the transmission unit sends a request for a response to a modem connected to the network to respond to the first selected receiver, the first selected receiver is determined to have sufficient RF connectivity if the spare receiver receives a response from the modem to the request for a response.

3. The apparatus of claim 2, wherein the first receiver is determined to be eligible for load balancing if the spare receiver receives a response from the modem to the request for a response.

4. The apparatus of claim 2, wherein the microprocessor further determines if additional receivers of the Load Balancing Group or Spectrum Group do not have a modem registered.

5. A method of determining connectivity status of a receiver in a Load Balancing Group or Spectrum Group having a plurality of receivers comprising the steps of:

(A) identifying a receiver of the plurality of receivers which does not have a modem registered thereon as an unregistered receiver;

(B) connecting a spare receiver to a signal line associated with the unregistered receiver;

(C) configuring a spare receiver to substantially communicate with communication protocols associated with a selected receiver of the plurality of receivers;

(D) providing a request for information from a transmission unit to a modem connected to the selected receiver; and (E) determining if the spare receiver detects a response from the modem.

6. The method of claim 5, wherein if the spare receiver detects a response from the modem, the unregistered receiver is determined to have sufficient RF connectivity.

7. The method of claim 5, wherein the first receiver is determined to be eligible for load balancing if the spare receiver receives a response from the modem to the request for a response.

8. The method of claim 5 further including the step of determining if there are additional receivers of the Load Balancing Group or Spectrum Group which do not have a modem registered, and repeating steps B-E.

9. A computer readable medium in the form of a machine, article of manufacture, or composition of matter containing instructions for a processor to control a load balancing operation associated with a Load Balancing Group or Spectrum Group of a plurality of receivers, the computer readable medium containing instructions for the processor to perform the steps of:

(A) identifying a receiver of the plurality of receivers which does not have a modem registered thereon as an unregistered receiver;

(B) connecting a spare receiver to a signal line associated with the unregistered receiver;

(C) configuring a spare receiver to substantially communicate with communication protocols associated with a selected receiver of the plurality of receivers;

(D) providing a request for information from a transmission unit to a modem connected to the selected receiver; and (E) determining if the spare receiver detects a response from the modem.

10. The computer readable medium of claim 9, wherein if the spare receiver detects a response from the modem, the unregistered receiver is determined to have sufficient RF connectivity.

11. The computer readable medium of claim 9, wherein the first receiver is determined to be eligible for load balancing if the spare receiver receives a response from the modem to the request for a response.

12. The computer readable medium of claim 9, wherein the computer readable medium further contains instructions to perform the step of determining if there are additional receivers of the Load Balancing Group or Spectrum Group which do not have a modem registered, and repeating steps B-E.

* * * * *